United States Patent [19]

Spackman

[11] Patent Number: 5,739,818

[45] Date of Patent: Apr. 14, 1998

[54] APPARATUS AND METHOD FOR PERFORMING PERSPECTIVELY CORRECT INTERPOLATION IN COMPUTER GRAPHICS

[75] Inventor: John Neil Spackman, Guildford, England

[73] Assignee: Canon Kabushiki Kaisha, Tokyo, Japan

[21] Appl. No.: 454,821

[22] Filed: May 31, 1995

[51] Int. Cl.$^6$ .............................. G06T 11/40; G06T 15/20
[52] U.S. Cl. ................................. 345/425; 345/430
[58] Field of Search ........................ 395/141, 142, 395/143, 130, 125; 364/718, 723

[56] References Cited

U.S. PATENT DOCUMENTS

| | | | |
|---|---|---|---|
| 4,371,933 | 2/1983 | Breshenham et al. | 395/142 |
| 4,789,954 | 12/1988 | Iida et al. | 364/718 X |
| 5,179,647 | 1/1993 | Chang | 395/142 |

FOREIGN PATENT DOCUMENTS

WO89/1206  2/1989  WIPO.

OTHER PUBLICATIONS

Foley et al., "Computer Graphics: Principles and Practice", Second Edition, Addison–Wesley Publishing Co., pp. 951–961, 1990.

"Computer Graphics Principles and Practice" by Foley, Van Dam, Feiner and Hughes, 2nd Ed., Addison–Wesley Publishing Company, ISBN 0–201–12110–7, pp. 71–91.

"Hyperbolic Interpolation" by James F. Blinn, in Jim Blinn's Corner, IEEE Computer Graphics and Applications, Jul. 1992, pp. 89–94.

"Algorithm For Computer Control of a Digital Plotter" by J.E. Bresenham, IBM Systems Journal, vol. 4, No. 1, 1965, pp. 25–30.

"A Linear Algorithm For Incremental Digital Display of Circular Arcs" by Jack Bresenham, Communications of the ACM, Feb. 1977, vol. 20, No. 2 pp. 100–106.

"Algorithm For Drawing Ellipses or Hyperbolae With A Digital Plotter", M.L. Pitteway, Comptr. 5, 10, 3 (Nov. 1967) pp. 282–289.

Internet Postings by Jamie Lokier, dated: (i) 24 Sep. 1993 (ii) 15 May 1994.

*Primary Examiner*—Mark K. Zimmerman
*Attorney, Agent, or Firm*—Fitzpatrick, Cella, Harper & Scinto

[57] ABSTRACT

In an apparatus and method for performing perspective interpolation of texture coordinates in computer graphics, an incremental interpolation technique is used to calculate the pixel values along a display line from the associated texture map. The incremental technique is based on Bresenham's algorithm adapted for use with hyperbolae. On the basis of the parameters of the start and end pixels of a span along a display line, a set of interpolation test parameters is set and the texel coordinates for the current pixel are tested against these parameters to determine whether they are still valid for the next pixel. If they are not valid, the test parameters are updated and the texel coordinates are incremented and retested. This process is repeated until the correct texel is identified.

49 Claims, 5 Drawing Sheets

APPARATUS AND METHOD FOR PERFORMING PERSPECTIVELY CORRECT INTERPOLATION IN COMPUTER GRAPHICS

BACKGROUND OF THE INVENTION

1. Field of the Invention

The present invention relates to an image processing apparatus and method for performing texture mapping and similar operations, with particular application in 3-dimensional ("3D") computer graphics. The invention has particular use in interpolating parameters such as texture coordinates in perspective view.

2. Description of Prior Art

Texture mapping is well known in the art of 3-dimensional image synthesis (see for example "Computer Graphics Principles and Practice" by Foley, van Dam, Feiner and Hughes, 2nd Edition, Addison-Wesley Publishing Company, ISBN 0-201-12110-7).

The process of texture mapping is useful for applying surface detail to 3D objects within an image to be displayed. A pre-stored image of the surface details is mapped onto the surface of an object in order to display the image. The surface image is known as a "texture map" or "texture image", and is made up of individual elements called texels, residing in texture coordinate space (defined by the variables U,V). The texture map may represent, for example, a colour, transparency or shadow profile etc. Similar processes are known as "bump mapping" (representing surface normal variations) and "environment mapping" (representing image reflections), and it will be understood that the present disclosure, while referring simply to "texture mapping", implicitly extends to include all such processes in which a surface property is modulated over the area of a surface primitive.

To perform texture mapping, the coordinates of a display pixel lying within an area representing the object are mapped into texture coordinates space, to define a corresponding texel or texels. The value for the pixel is then derived from the value of the texel(s).

It is known in the art that, in a perspective projection of a 3D object from object space to display space, linear changes in pixel position produce non-linear changes in each texel coordinate. Specifically, each texel coordinate is a hyperbolic function of pixel position. This is disclosed in, for example, "Hyperbolic Interpolation" by James F. Blinn in Jim Blinn's Corner, IEEE Computer Graphics and Applications, July 1992. Accordingly, to perform texture mapping with correct perspective, it has previously been necessary to evaluate two hyperbolic equations (one for each texel coordinate) every time a pixel value is determined. This is very time consuming, principally since each function evaluation requires a division operation (each requiring many cycles in a typical microprocessor), and accordingly two such divisions need to be performed for every pixel, while the number of pixels to be processed is typically thousands or even millions.

The divisions per pixel may be avoided if the object to be displayed lies in a plane of constant depth in viewing space. This is because, in this special case, texel coordinates are linearly related to pixel position. Accordingly, in a number of known systems, lines of constant depth along an object surface are defined so that rendering of the pixels corresponding to these constant depth lines can be carried out. This provides good results for limited classes of simple graphic objects, such as horizontal floors and vertical walls, in a limited system where the view direction is always parallel to the floor. However, constant-depth techniques are problematic in more general graphics, since lines of constant depth often do not correspond to lines or columns of pixels on the screen, making rendering complex.

In more generally useful graphic systems, therefore, the division per pixel has always been tolerated where perspectively-correct mapping is desired, or else correct perspective has been only approximated, to increase performance on a given hardware platform, for example by replacing the hyperbola with simple linear, piecewise linear or polynomial approximations, or by dividing the polygons to be rendered into smaller ones by tessellation. Particularly in animated sequences, however, mappings without correct perspective result in unnatural motion effects ("swimming") limiting the utility of the system.

BRIEF SUMMARY OF THE INVENTION

It is an object of the invention to provide a new low-cost technique for texture mapping, and similar operations, with correct perspective.

According to a first aspect of the invention, there is provided a method of surface parameter mapping in which a surface parameter mapping coordinate value is assigned by testing whether the mapping coordinate value corresponding to a current pixel position is valid at a next pixel position. The values of two or more coordinates may be tested separately. If either coordinate value corresponding to a current pixel is not valid at a next pixel, according to a current decision criterion, that coordinate value is incremented or decremented until the correct value is reached.

In a second aspect, the invention provides a method of surface parameter interpolation in which an initial set of test parameters is set and a surface parameter value is assigned with reference to the test parameters, the test parameters being updated after each surface parameter value is assigned. The surface parameter may be a mapping coordinate indexing, for example, a texture map.

BRIEF DESCRIPTION OF THE DRAWINGS

Embodiments of the invention will now be described by way of example, in conjunction with the accompanying drawings, in which.

DETAILED DESCRIPTION OF EXEMPLARY EMBODIMENTS

Figure 1:
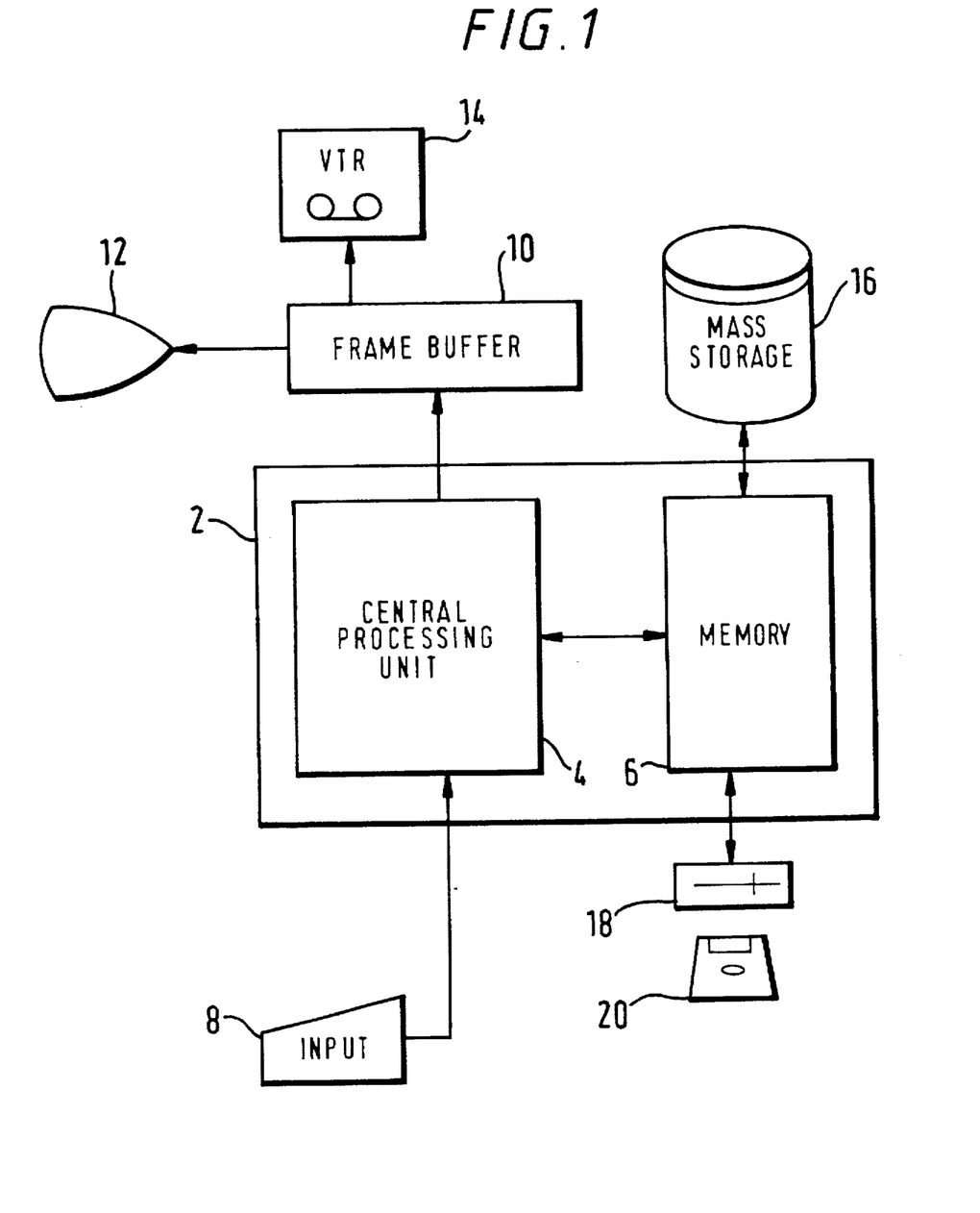
FIG. 1 is a block diagram showing the general arrangement of an image processing apparatus according to an embodiment of the invention.

FIG. 1 is a block diagram showing the general arrangement of an image processing apparatus according to a first embodiment. In the apparatus, there is provided a computer 2, which comprises a central processing unit (CPU) 4 connected to a memory 6 operable to store a program defining the sequence of operations of the CPU 4, and to store object and image data used in calculations by the CPU 4.

Coupled to an input port of the CPU 4 there is an input device 8, which may comprise, for example, a keyboard and/or a position sensitive input device such as a mouse, tracker-ball, or a digitizer tablet and stylus etc.

Also coupled to the CPU 4 is a frame buffer 10 which comprises a memory unit arranged to store image data relating to at least one image, for example by providing one (or several) memory location(s) per pixel of the image. The value stored in the frame buffer for each pixel defines the colour or intensity of that pixel in the image.

Images are generally two-dimensional arrays of pixels, and are conveniently described in terms of cartesian coordinates, so that the position of a given pixel can be described by a pair of x-y coordinates. This representation is convenient when, for example, the image is to be displayed on a raster scan display since the x coordinate maps to the distance along a line of the display, and the y coordinate maps to the number of the line. The frame buffer 10 has sufficient memory capacity to store at least one image. For example, for an image having a resolution of 1000×1000 pixels, the frame buffer 10 includes $10^6$ pixel locations, each addressable directly or indirectly in terms of pixel coordinates x,y.

Coupled to the frame buffer 10 is a display unit 12 for displaying the image stored in the frame buffer 10 in a conventional manner. Also coupled to the frame buffer 10 is a video tape recorder (VTR) 14 or other image recording device, such as a paper printer or 35 mm film recorder.

Coupled to the memory 6 (typically via the CPU 4), and possibly also to the frame buffer 10, is a mass storage device 16, such as a hard disc drive, having a high data storage capacity. Also coupled to the memory 6 is a disc drive 18 which is operable to accept removable data storage media, such as a floppy disc 20, and to transfer data stored thereon to the memory 6.

The CPU 4, memory 6, frame buffer 10, display unit 12 and mass storage device 16 may be commercially available as a complete system, for example as a personal computer (PC) or a workstation such as the SparcStation available from Sun Microsystems.

Embodiments of the invention can be supplied commercially in the form of programs stored on a floppy disc 20 or other medium, or signals transmitted over a data link, so that the receiving hardware becomes re-configured into an apparatus embodying the invention. As will be seen, the invention allows technically better performance to be achieved than was hitherto possible with a given type of computer hardware.

The overall operation of the apparatus will now be described.

Figure 2:
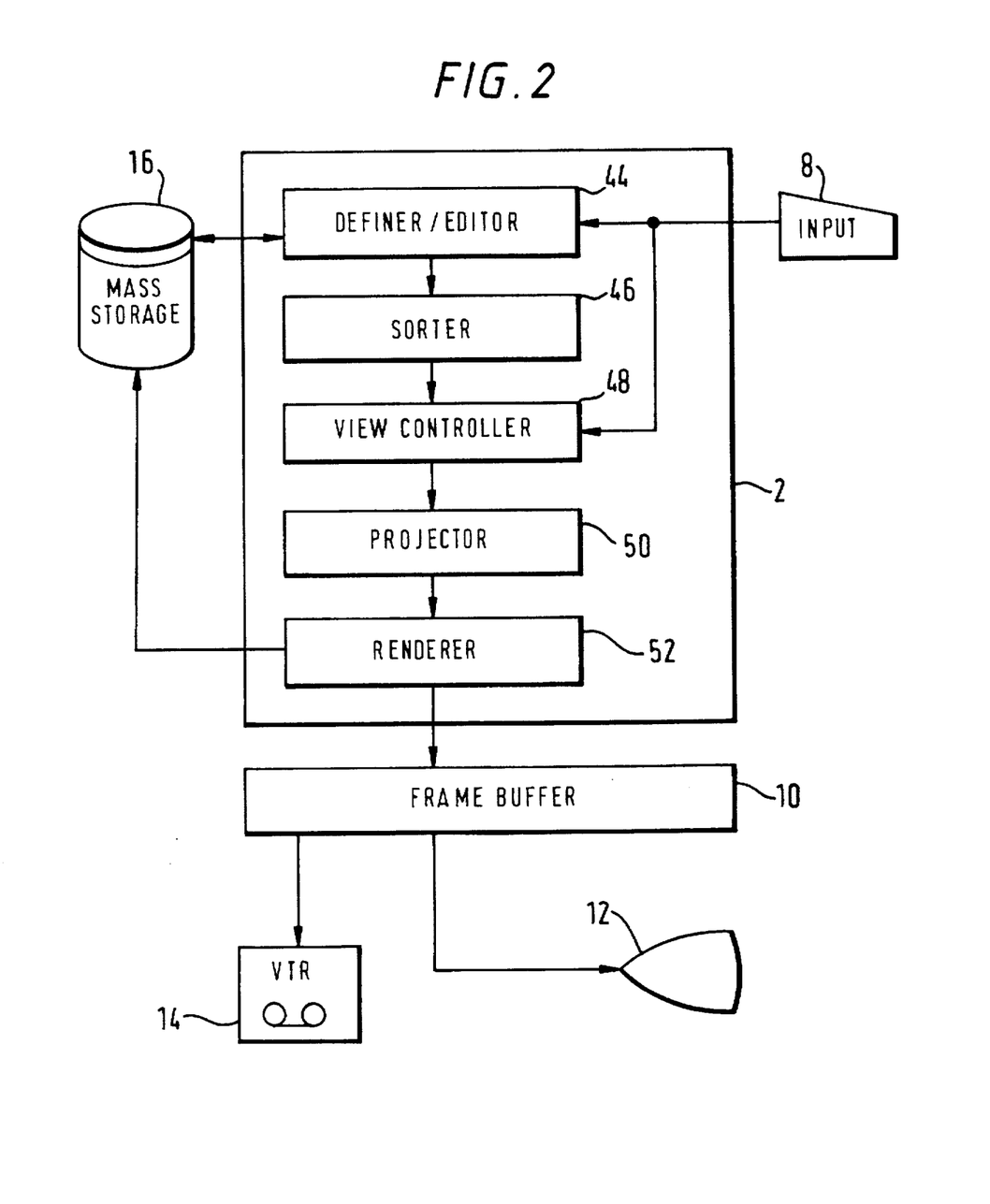
FIG. 2 schematically illustrates the operations performed by the computer in an embodiment of the invention.

With reference to FIG. 2, the computer 2 performs a number of different operations at different times, executing corresponding stored programs within the memory 6, and therefore comprises (together with the memory 6) means 44 to 52 for performing such operations. These means are illustratively shown in FIG. 2 as separate, although in the present embodiment, all are performed by the CPU 4 in cooperation with the memory 6. It will be understood, however, that separate processors or dedicated logic circuits, operatively connected, could be provided to execute each function.

The embodiment may thus be considered as comprising, firstly, a definer and editor 44 arranged to define the shape of a two- or three-dimensional object and likewise, optionally, to edit the object. The definer/editor 44 is connected to the mass storage device 16 to enable an object, once defined, to be stored for subsequent use. The definer/editor 44 is also connected to the input device 8 to enable an operator to input and/or change the object. In the present embodiment, the data defining an object is data representing control points or vertices of a plurality of surfaces making up the object, which in the present embodiment are polygons. If a texture image is to be applied to the object, the definer/editor 44 is also used to assign a texture coordinate pair of the pre-stored texture image to each vertex of each polygon in the object.

Sorter 46 is provided for performing an initial operation of sorting the surfaces or regions of the object into an order which determines the order in which they will be drawn (i.e. rendered into the frame buffer 10) so as to draw last those regions which are intended to occlude others. The sorter 46 reads the object data defined by the definer/editor 44 and generates a corresponding sorted list of regions for subsequent use.

The appearance of the object on the two dimensional screen of the display unit 12, and consequently the image data stored in the frame buffer 10, is dependent upon the view direction from which the object is to be viewed. It may also be dependent upon the distance between the object and a notional viewpoint corresponding to the plane of the screen of the display unit 12. View controller 48 is therefore provided for enabling an operator to define a view direction, or a view direction and a distance (for example, by defining the coordinates of a viewpoint and/or view direction), via the input device 8. Rather than defining individual viewpoints one at a time, the input means 8 may be employed to define a trajectory of successive viewpoints or viewing directions, for example by specifying a direction of movement and speed.

Projector 50 is provided to perform a projection of each polygon within a given three dimensional object into the two dimensional viewing plane.

Each two dimensional viewing plane region projected by the projector 50 is then rendered, in the order previously defined by the sorter 46, by a renderer 52 which fills the region (that is, allocates an appropriate colour or grey scale value to each pixel location in the frame buffer 10 which lies within the region). In performing the rendering operation, the renderer 52 is arranged to test each region to determine which direction in the projected plane it is facing, since only regions which face outwardly of the object ("forward facing") need to be rendered. In addition, the renderer 52 performs texture mapping before writing the pixel values into the frame buffer 10, as will now be described.

The renderer 52 receives data from the projector 50 defining each polygon in terms of its vertices. For each vertex, the renderer 52 receives data defining the pixel position within the 2-D raster display in terms of the x,y coordinates described previously, a value defining the reciprocal of the depth of the vertex in eye space (commonly known in the art as a 1/z value), and, if a texture map is to be applied to the polygon, the data defining the texel location of the vertex in terms of the two quantised texture map coordinates (which will hereinafter be referred to as U and V) defined by the definer/editor 44. This is illustrated schematically in FIG. 3 for a polygon having vertices A, B, C and D (with the values associated with each vertex having the suffix a, b, c or d accordingly).

The way in which the renderer 52 completes the texture mapping process to determine values for each pixel within the polygon will now be described with reference to FIG. 4.

Figure 3:
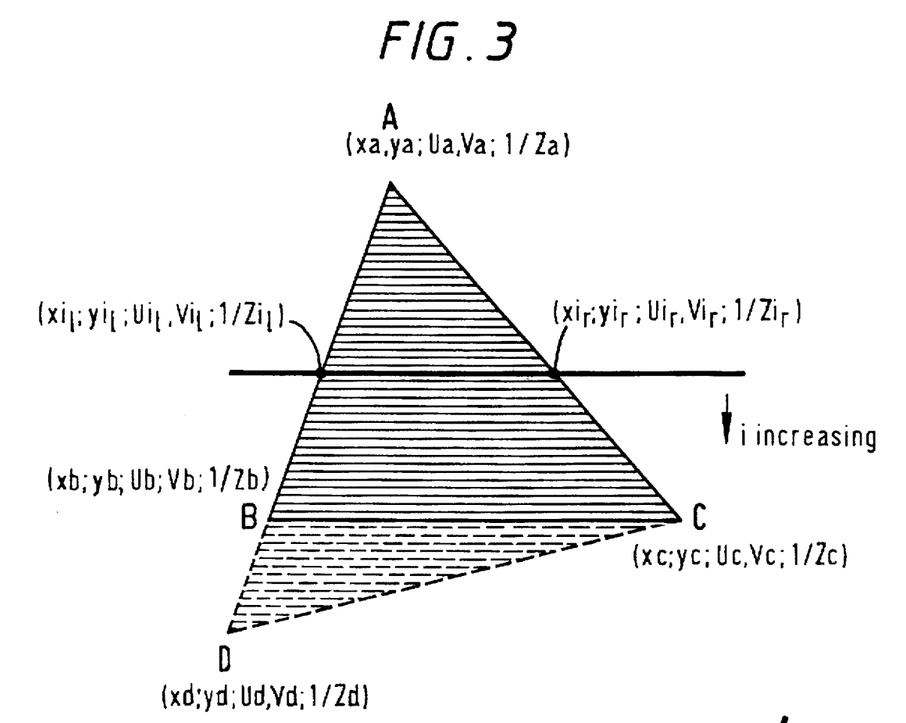
FIG. 3 schematically illustrates a triangular polygon to be rendered in the display image, and the data associated with each vertex of the polygon.

At step 60, the renderer 52 reads the data described above for each vertex of the polygon. At step 62, this data is then used to calculate the following "delta" values (gradient with respect to y) for the left and right sides of the polygon:

$$\Delta x_l = \frac{xb - xa}{yb - ya}$$

$$\Delta x_r = \frac{xc - xa}{yc - ya}$$

where, $\Delta x_l$ is the delta value for the left-hand side of the polygon shown in FIG. 3, $\Delta x_r$ is the delta value for the right-hand side of the polygon, x is the pixel position for a vertex along a given scan line, and y is the number of the scan line on which the vertex lies.

The left and right delta values are then used at step 64 to determine the start and end pixels on the scan line to be rendered. The y coordinate of the start and end pixels is given by the number of the scan line (that is, $yi_l=yi_r=ya+i$, where i is the number of the scan line running from 0 at the scan line containing vertex A to yb-ya at the scan line containing vertex B; see FIG. 3), while the x coordinates are given by:

$$xi_l = xa + i\Delta x_l$$

$$xi_r = xa + i\Delta x_r$$

where, $xi_l$ is the x coordinate of the start (left) pixel and $xi_r$ is the x coordinate of the end (right) pixel.

In practice, the scan lines are dealt with sequentially, so that the values of $i\Delta x_l$ and $i\Delta x_r$ are determined for each line simply by incrementing the previous value by $\Delta x_l$ or $\Delta x_r$ as appropriate.

At step 66, the renderer 52 determines the U,V and 1/z values for the start and end pixels determined at step 64. Since 1/z varies linearly along the sides of the polygon between vertices, its value at the start and end pixels is determined from the vertex data read at step 60 using the following linear equations:

$$Ri_l = Ra + i\left[\frac{Rb - Ra}{yb - ya}\right]$$

$$Ri_r = Ra + i\left[\frac{Rc - Ra}{yc - ya}\right]$$

where, $Ri_l$ is the 1/z value at the start pixel on the ith scan line, $Ri_r$ is the 1/z value at the end pixel on the ith scan line, Ra=1/Za, and Rb=1/Zb.

As is known to persons skilled in the art, for example from the Blinn reference above, the values of U and V should vary hyperbolically along the edges of the polygon between the vertices for correct perspective. Accordingly, the U and V values for the start and end pixels on a given scan line are calculated in this embodiment using the following hyperbolic equations:

$$Ui_l = \frac{RaUa(1 - q_l) + q_l RbUb}{Ra(1 - q_l) + q_l Rb}$$

$$Ui_r = \frac{RaUa(1 - q_r) + q_r RcUc}{Ra(1 - q_r) + q_r Rc}$$

$$Vi_l = \frac{RaVa(1 - q_l) + q_l RbVb}{Ra(1 - q_l) + q_l Rb}$$

$$Vi_r = \frac{RaVa(1 - q_r) + q_r RcVc}{Ra(1 - q_r) + q_r Rc}$$

where, $Ui_l$ is the U value at the start pixel, $Ui_r$ is the U value at the end pixel, $Vi_l$ is the V value at the start pixel, $Vi_r$ is the V value at the end pixel, Ra and Rb are as defined above, and $q_l$ and $q_r$ are variables which vary linearly between 0 and 1 in accordance with the distance of the pixel along the left and right edges respectively of the polygon between the vertices, $q_l$ and $q_r$ therefore being given by the following equations:

$$q_l = \frac{i}{yb - ya}$$

$$q_r = \frac{i}{yc - ya}$$

Referring again to FIG. 4, at step 68, the renderer 52 calculates the value of each pixel along a given scan line between the start pixel and the end pixel using the values calculated in step 66, and stores all of the values for the span of pixels, for example in the frame buffer 10. The manner in which this is performed is described below.

At step 70, a check is made as to whether the scan line just processed is the last scan line within the polygon. If it is not, steps 64 to 70 are repeated until all of the scan lines have been processed. The rendering of the polygon is then complete, and the process for that particular polygon ends at step 72, although of course it will be appreciated that the whole of the process shown in FIG. 4 can subsequently be repeated for other polygons. If the triangle to be rendered is the triangle ADC shown in FIG. 3, then the triangle may be split at vertex C (i.e. the middle vertex in the vertical direction) so that triangles ABC and BDC are rendered separately, in the conventional manner.

The way in which the renderer 52 performs step 68 in FIG. 4 will now be described with reference to FIG. 5.

Figure 4:
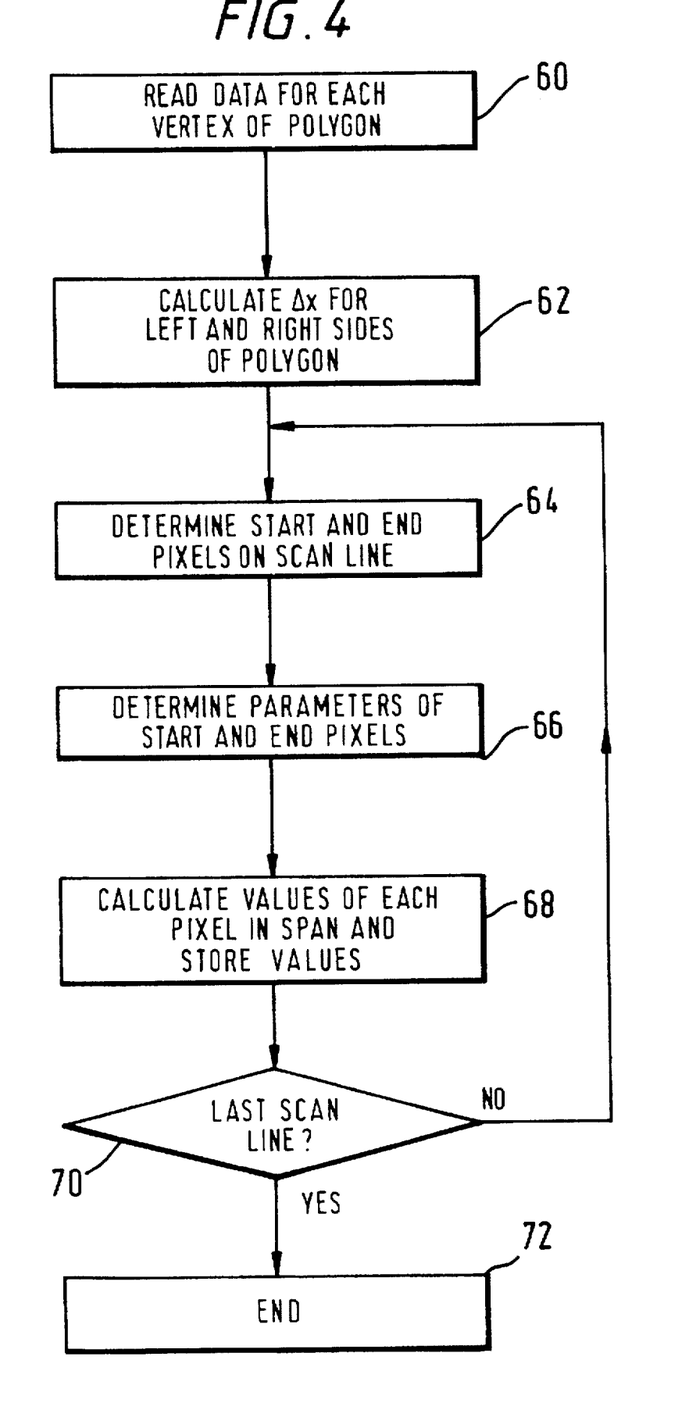
FIG. 4 shows the steps performed in texture mapping in an embodiment of the invention.

At step 100, the renderer 52 sets the following interpolation test parameters on the basis of the parameters of the start and end pixels for the line calculated at step 66 in FIG. 4:

$$\Delta\Delta D_{p,t} = \frac{2}{Z_r} - \frac{2}{Z_l}$$

$$\Delta_t D_{p,t} = \Delta\Delta D_{p,t} + \frac{2s}{Z_l}$$

If $U_r - U_l > 0$ set:

$$\Delta_p{}^u D_{p,t} = \frac{1}{2} \Delta\Delta D_{p,t} - \frac{2}{Z_r}(U_r - U_l)$$

and set: Sign delta U=1 else set:

$$\Delta_p{}^u D_{p,t} = \frac{1}{2} \Delta\Delta D_{p,t} + \frac{2}{Z_r}(U_r - U_l)$$

and set: Sign delta U=−1

If $V_r-V_1>0$ set:

$$\Delta_p{}^v D_{p,s} = \frac{1}{2} \Delta\Delta D_{p,s} - \frac{2}{Z_r}(V_r - V_l)$$

and set: Sign delta V=1
else set:

$$\Delta_p{}^v D_{p,s} = \frac{1}{2} \Delta\Delta D_{p,s} + \frac{2}{Z_r}(V_r - V_l)$$

and set: Sign delta V=−1
The renderer 52 also sets the following test parameters:

$$D^u_{p,s} = \frac{1}{2}[2\Delta_p{}^u D_{p,s} + \Delta_t D_{p,s} - \Delta\Delta D_{p,s}]$$

$$D^v_{p,s} = \frac{1}{2}[2\Delta_p{}^v D_{p,s} + \Delta_t D_{p,s} - \Delta\Delta D_{p,s}]$$

where s, is the number of pixels along the scan line which lie within the polygon, s therefore being given by:

$$s = x_r - x_l$$

(Strictly, S is given by $s=x_r-x_l+1$, but the term "+1" is ignored since it has a neglisible effect on the result.)

At step 100, the renderer 52 also initialises the first texel, this being defined by the texture space coordinates of the start pixel. Accordingly, the values of U and V which are used at step 100 to look up a texel value will be those previously calculated for the start pixel at step 66 in FIG. 4.

At step 102, the values of the texel are plotted to the pixel, which, in this embodiment is then stored, for example in the frame buffer 10. In performing step 102 for the first time, the pixel will be the start pixel on the scan line. In addition to storing the pixel value, the U,V values are also retained locally, for example in a register or cache within the CPU 4, for use in subsequent steps, as will now be described.

At step 104, a test is performed to determine whether the pixel just considered is the last pixel on the scan line segment that is to be subject to dithering. If the pixel is the last pixel, then the process terminates at step 106. If the pixel is not the last pixel, the process proceeds to consider the next pixel, as will now be described.

At step 108, a test is performed to determine whether the retained value of U is valid for the next pixel. This test is performed by determining whether $D^u_{p,s}<0$.

If the value of $D^u_{p,s}$ is negative, it is determined that the value of U is not valid for the next pixel, and the process proceeds via steps 110 to 116. At step 110, the test parameters previously set at step 100 are updated as follows:

$$D_{p,s}{}^u \leftarrow D_{p,s}{}^u + \Delta_t D_{p,s}$$

$$\Delta_p{}^u D_{p,s} \leftarrow \Delta_p{}^u D_{p,s} + \Delta\Delta D_{p,s}$$

At step 112, the value of U, that is the value considered in the test previously carried out at step 108, is changed by 1, so that:

$$U \leftarrow U + \text{Sign delta } U$$

where, the value of Sign delta U has been set to either 1 or −1 at step 100, in dependence upon the value of $U_r-U_l$ as described previously.

At step 114 the test performed in step 108 is repeated with the updated test parameters (set at step 110) to determine whether the new value of U, that is the value now changed by ±1, is the correct value for the pixel under consideration. If the value of U is now correct, the texel defined by the new value of U and the previous value of V is read at step 116. If the value of U is not correct, steps 110,112 and 114 are repeated until it is determined at step 114 that $D^u_{p,s}$ is non-negative, indicating that the correct value of U has now been reached.

The process then proceeds to steps 118 to 126, in which the tests performed in steps 108 to 116 for U are repeated for V. More specifically, at step 118 it is tested whether $D^v_{p,s}<0$, and if this is the case, steps 120 to 126 are performed, with the test parameters being updated in step 120 as follows:

$$D_{p,s}{}^v \leftarrow D_{p,s}{}^v + \Delta_t D_{p,s}$$

$$\Delta_p{}^v D_{p,s} \leftarrow \Delta_p{}^v D_{p,s} + \Delta\Delta D_{p,s}$$

and the value of V being changed in step 122 as follows:

$$V \leftarrow V + \text{Sign delta } V$$

When the correct value of V has been reached (i.e. when it is determined at step 124 that $D^v_{p,s}$ is non-negative), the process proceeds to step 126 where the new texel is read (thereby negating any texel read at step 116). The test parameters are then updated at step 128 in order to consider the next pixel as follows:

$$D_{p,s}{}^u \leftarrow D_{p,s}{}^u + \Delta_p{}^u D_{p,s}$$

$$D_{p,s}{}^v \leftarrow D_{p,s}{}^v + \Delta_p{}^v D_{p,s}$$

$$\Delta_t D_{p,s} \leftarrow \Delta_t D_{p,s} + \Delta\Delta D_{p,s}$$

If in step 108 it is determined than the value of U is valid for the next pixel, the process proceeds directly to step 118, missing out step 110 to 116. Similarly, if it is determined at step 118 that the value of V is valid for the next pixel, the process proceeds directly to step 128. In this case, no new texel is read, so that at step 102, the previous (current) texel is plotted to the next pixel.

Steps 102 to 128 are then repeated until it is determined in step 104 that the pixel is the last one in the span, the process then terminating at step 106.

The reasons why the process described above generates the required texture coordinate values for pixels within a polygon will now be explained.

As explained previously, for correct perspective, the values of each texture coordinate U,V vary hyperbolically in relation to linear changes in display pixel position. Thus, considering the polygon previously described with respect to FIG. 3, U and V vary with the pixel position along a scan line as follows:

$$t(p) = \frac{t_l Z_r(s-p) + t_r Z_l p}{Z_r(s-p) + Z_l p}$$

$$= \frac{p(Z_l t_r - Z_r t_l) + Z_r t_l s}{p(Z_l - Z_r) + s Z_r}$$

$$= \frac{\alpha p + \beta}{\gamma p + \delta}$$

where, t is a quantised texture coordinate (i.e. either U or V), p is the pixel position along the scan line varying from 0 at the start pixel of the polygon segment to s at the end pixel of the polygon segment, and the final equation in α, β, γ and δ is the general equation for a hyperbola.

Differentiating, the slope of this hyperbola is:

$$\frac{dt}{dp} = sZ_1Z_r \frac{t_r - t_1}{[Z_r(s-p) + z_1p]^2}$$

Since the denominator of this term is always positive (the values of Z being positive since only objects in front of the viewer are considered), the sign of the slope is always the sign of the numerator, i.e. the sign of $(t_r-t_1)$, so that the hyperbola is either monotonically increasing or monotonically decreasing.

When moving from pixel to pixel from left to right across a scan line (i.e. p increasing), if the hyperbola has a positive slope, the candidate texture coordinate values at the next pixel position are those above or at the current value. Similarly, if the hyperbola has a negative slope, the candidate texture coordinate values at the next pixel position are those below or at the current value.

Considering as an example a hyperbola having a positive slope, having found the pixel/texel pair (p,t) closest to the hyperbola at pixel p (step 66 in FIG. 4), the values at the next pixel are (p+1,t), or (p+1,t+1) or (p+1,t+2) ... etc.

Figure 6:
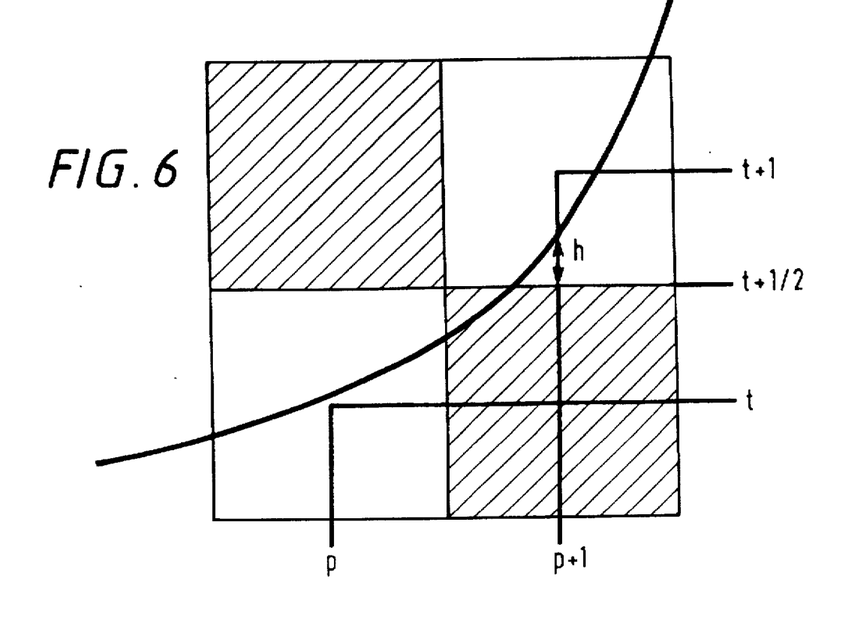
FIG. 6 schematically illustrates the method used in an embodiment of the invention for determining the correct texel value.

Referring to FIG. 6, to determine which of these values is the correct one, the embodiment described above considers the height, h, of the midpoint (p+1,t+½) between (p+1,t) and (p+1,t+1) above the hyperbola. If h is positive, the appropriate texture coordinate value at the next pixel position remains as t; otherwise, it is t+1 or t+2 or t+3 ... etc.

The value of h is given by the following:

$$h = \left(t + \frac{1}{2}\right) - \frac{t_1Z_r[s-(p+1)] + t_rZ_1(p+1)}{Z_r[s-(p+1)] + Z_1(p+1)}$$

Multiplying through by twice the denominator of the second term, that is, by $2[Z_r[s-(p+1)]+Z_1(p+1)]$ does not affect the sign of h, and instead provides a more efficiently evaluated decision variable $d_{p,t}$ as follows:

$$d_{p,t} = Z_1(p+1)(1-2t_r+2t) + Z_r[(p-s+1)(2t-1)+t(2s-2p-2)]$$

If $d_{p,t}$ is positive (tested at steps 108 and 118 in FIG. 5), the required texture coordinate value is t. Otherwise, t is incremented to t+1 (steps 112 and 122) and the decision re-evaluated by evaluating d(p,t+1) (steps 114 and 124). This process iterates until the decision variable becomes non-negative.

In the embodiment described above, d(p,t+1) is found by incrementing d(p,t) by $\Delta_t d_{p,t}$ (steps 110 and 120), as follows:

$$\begin{aligned}
d_{p,t+1} &= Z_1(p+1)[1-2t_r+2(t+1)] + \\
&\quad Z_r[(p-s+1)(2t_1-1)+(t+1)(2s-2p-2)] \\
&\rightarrow \Delta_t d_{p,t} = d_{p,t+1} - d_{p,t} \\
&= 2[Z_1(p+1) + Z_r(s-p-1)]
\end{aligned}$$

Once the decision variable becomes non-negative, the appropriate texture coordinate value for the next pixel column has been found. The appropriate value at the column after that is found by repeating the iteration, starting with d(p+1,t), which is set at step 128 in FIG. 5. In the embodiment described above, d(p+1,t) is found by incrementing d(p,t) by $\Delta_p d_{p,t}$ as follows:

$$\begin{aligned}
d_{p+1,t} &= Z_1((p+1)+1)(1-2t_r+2t) + \\
&\quad Z_r[((p+1)-s+1)(2t_1-1) + \\
&\quad t(2s-2(p+1)-2)] \\
&\rightarrow \Delta_p d_{p,t} = d_{p+1,t} - d_{p,t} \\
&= Z_r(2t_1-2t-1) + Z_1(2t-2t_r+1)
\end{aligned}$$

The present embodiment also employs second differences ($\Delta\Delta$ values) to increment the values of $\Delta_t d_{p,t}$ (step 128) and $\Delta_p d_{p,t}$ (steps 110 and 120), as follows:

For $d_{p,t}<0$:new p value, p'=p and new t value, t'=t; so that:

$$\Delta_t(\Delta_t d_{p,t})=0$$

$$\Delta_t(\Delta_p d_{p,t})=2Z_1-2Z_r$$

while for $d_{p,t}>0$:p'=p+1, and t'=t; so that $$\Delta_p(\Delta_t d_{p,t})=2Z_1-2Z_r$$

$$\Delta_p(\Delta_p d_{p,t})=0$$

Accordingly $\Delta_t(\Delta_p d_{p,t})=\Delta_p(\Delta_t d_{p,t})$, and these values are employed in the embodiment described above.

Therefore, when starting the interpolation along a scan line at the left hand edge of the polygon segment, the initial values for interpolation parameters are as follows:

$$\begin{aligned}
\Delta_p(\Delta_t d_{p,t}) &= 2Z_1 - 2Z_r \\
\Delta_t(\Delta_p d_{p,t}) &= 2Z_1 - 2Z_r \\
&= \Delta_p(\Delta_t d_{p,t}) \\
\Delta_t d_{p,t} &= 2Z_1 - 2Z_r + 2Z_r s \\
&= \Delta_p(\Delta_t d_{p,t}) + 2Z_r s \\
\Delta_p d_{p,t} &= Z_1 - Z_r - 2Z_1(t_r - t_1) \\
&= \frac{1}{2}\Delta_p(\Delta_t d_{p,t}) - 2Z_1(t_r - t_1) \\
d_{p,t} &= Z_1 - Z_r + Z_r s - 2Z_1(t_r - t_1) \\
&= \frac{1}{2}[\Delta_t d_{p,t} + 2\Delta_p d_{p,t} - \Delta_p(\Delta_t d_{p,t})]
\end{aligned}$$

Consideration of the above values for the case where the slope of the hyperbola is negative, will show that the terms are identical, with the exception that the terms $\Delta_p d_{p,t}$ and $d_{p,t}$ differ by the sign of $(t_r-t_1)$. Accordingly, as described previously, these values are set at step 100 of FIG. 5 on the basis of whether $t_r-t_1$ is less than zero (i.e. in dependence on whether the hyperbola has a positive slope or a negative slope).

In practice, when dealing with polygons and vertex data as described previously with respect to FIG. 3, it is efficient to divide the decision variable $d_{p,t}$ by $Z_1Z_r$, giving a new decision variable $D_{p,t}$ since this assists in deriving the initial values from the vertex data. Accordingly, the parameters above then become as follows:

$$\Delta_p(\Delta_t D_{p,t}) = 2\frac{1}{Z_r} - 2\frac{1}{Z_1}$$

$$\begin{aligned}
\Delta_t(\Delta_p D_{p,t}) &= 2\frac{1}{Z_r} - 2\frac{1}{Z_1} \\
&= \Delta_p(\Delta_t D_{p,t})
\end{aligned}$$

-continued $$\Delta_t D_{p,s} = 2\frac{1}{Z_r} - 2\frac{1}{Z_1} + 2\frac{1}{Z_1} s$$

$$= \Delta_p(\Delta_t D_{p,t}) + 2\frac{1}{Z_1} s$$

$$\Delta_p D_{p,s} = \frac{1}{Z_r} - \frac{1}{Z_1} - 2\frac{1}{Z_r} abs(t_r - t_1)$$

$$= \frac{1}{2}\Delta_p(\Delta_t D_{p,t}) - 2\frac{1}{Z_r} abs(t_r - t_1)$$

$$D_{p,s} = \frac{1}{Z_r} - \frac{1}{Z_1} + \frac{1}{Z_1} s - 2\frac{1}{Z_r} abs(t_r - t_1)$$

$$= \frac{1}{2} [\Delta_t D_{p,s} + 2\Delta_p D_{p,s} - \Delta_p(\Delta_t D_{p,t})]$$

Figure 5:
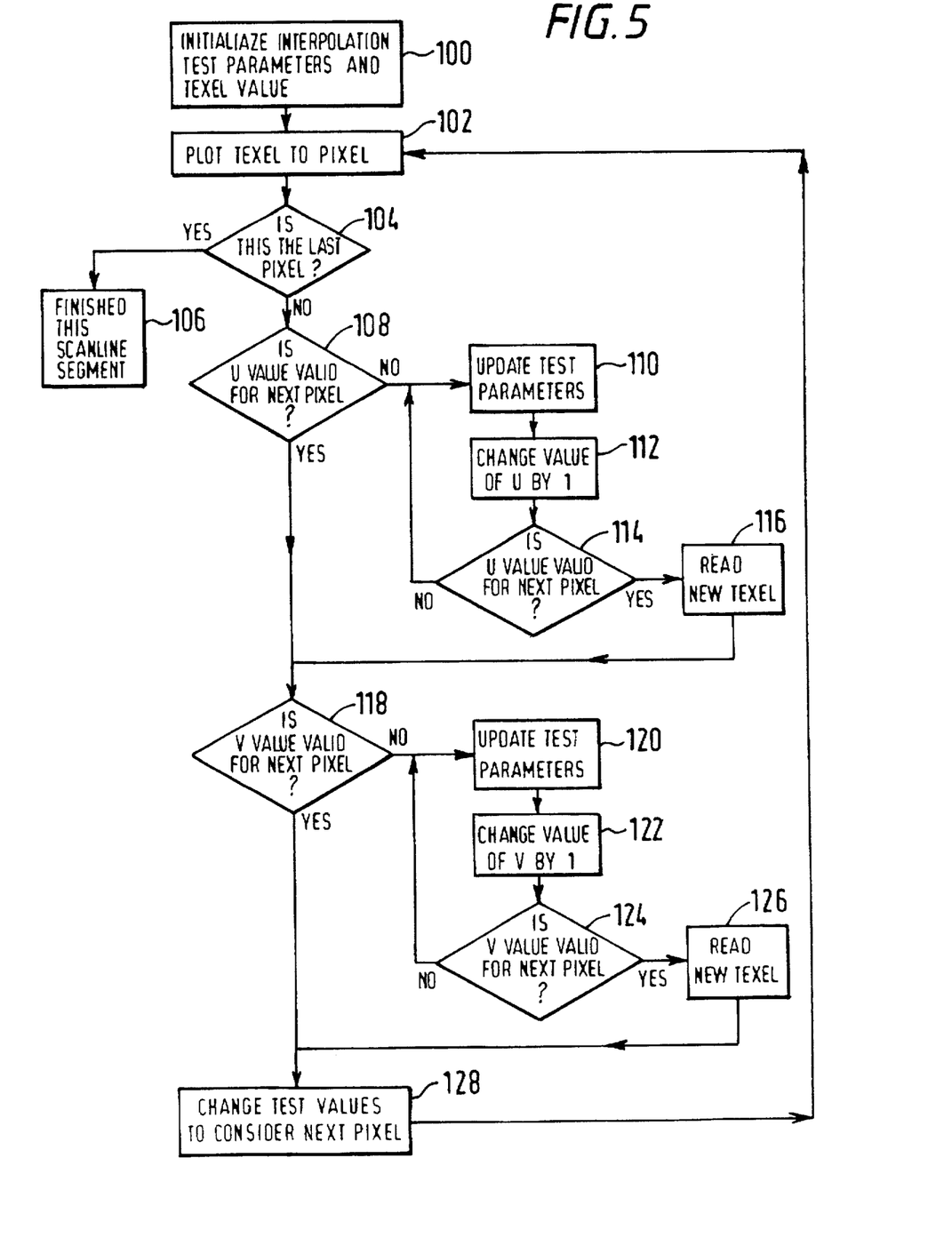
FIG. 5 shows the steps by which values of each pixel in a span are calculated at step 68 in FIG. 4 in an embodiment of the invention.

Consideration will show that these parameters are those which were set at step 100 in FIG. 5, with $abs(t_r-t_1)$ being set at step 100 in dependence upon the value of $t_r-t_1$.

In step 100, the initial test parameters are calculated using fixed point arithmetic, for example having 16 bits integer and 16 bits fractional parts. The person skilled in the art will recognise that this allows faster processing than is possible using floating point arithmetic. At the same time, however, the range of possible z values is very great. On the other hand, for the triangle ABC of FIG. 3 the units of Za, Zb, Zc are not important, provided the three values are in proportion. To obtain the best use of the fixed point resolution, the initialisation process uses 1/z values in units of Za, Zb, Zc (the product of the three vertex z values). In such units, the value 1/Za can be obtained simply by multiplying Zb and Zc. Similarly 1/Zb is the product ZaZc, and 1/Zc is the product ZaZb. As well as ensuring good use of the resolution of fixed point values, this choice of units avoids the need for three division operations, which are typically more time-consuming than multiplications.

Various modifications to the embodiment above can be made, as will now be described.

In the embodiment described above, at step 66 in FIG. 4, the U and V values for the start and end pixels of the span on the given scan line are determined by directly evaluating the appropriate hyperbolic equation (using a division operation). As an alternative, the values of U and V may be tracked down the edges of the polygon using similar interpolation algorithms to those detailed above. However, direct evaluation of the actual hyperbolic equation will generate the exact U and V values (to the precision of the machine), including fractional parts, thereby increasing accuracy during subsequent interpolation across the scan line segment.

At steps 110 to 114 and 120 to 124 in FIG. 5, the values of U and V are linearly incremented to find the correct values at the next pixel. However, it is possible to use other search techniques, such as "binary chop" techniques, which may converge faster. Often, the number of iterations around loop 110 to 114 (or loop 120 to 124) is the same as the number of iterations performed the previous time the process was performed (i.e. for the current pixel). Accordingly, the value of U (or V) may be changed by this number of iterations directly at step 112.

The present invention provides the advantage of increased speed in performing hyperbolic interpolation for texture mapping or similar operations. In previous systems, texture coordinate values along the span were calculated by evaluating the hyperbolic equations defining the relationship between pixel position and texture coordinates, which involved at least two division operations per pixel (typically costing about 50 cycles for each division alone). However, with the present invention, division operations per pixel are avoided.

The present invention exploits the pixel-space coherence that is found in many typical images to be rendered. That is, the texture coordinate from pixel to pixel does not usually change rapidly, and accordingly, the number of times that the loops 110 to 114 and 120 to 124 in FIG. 5 have to be performed is usually very small. Indeed, the maximum loop count for the U variable is equal to the number of texels in the U direction of the texture image while the maximum loop count for the V value is equal to the number of texels in the V direction. Accordingly, the invention provides particular advantages for texture maps that are of relatively small size, for example 128×128 texels, since the maximum loop count is then not large compared to the number of cycles required to perform the operations required in the prior art to evaluate the hyperbolic equation.

The skilled person will appreciate that the "texture coordinates" and "texel values" referred to above need not be limited to classic texture mapping where surface colour is modulated by the texel values, but also to other uses of the technique modulating reflectance, transparency, surface normal etc.

The invention is also applicable to the calculation of general parameter values across a projected surface, in addition to mapping coordinates such as U and V. For example, as described in the Blinn reference, it can also be desirable to interpolate between colour values specified at the polygon vertices, using a perspective correct (hyperbolic) interpolation function.

Also, the skilled person will appreciate that the pixels referred to above may be actual image output pixels as described above, but may alternatively be "sub-pixels" of a larger sub-pixel array, which are then filtered to provide fewer "anti-aliased" pixels for output.

It will be appreciated that these and further modifications and alterations might be made by those skilled in the art without departing from the spirit and scope of the invention.

I claim:

1. A method of operating an image processing apparatus to interpolate, in a perspectively correct manner, a quantized surface parameter over an object surface, which surface is represented with correct perspective by pixels in a display space, in order to determine values of said surface parameter for a succession of said pixels, said method comprising the steps of:

(a) setting a first value of said surface parameter for a first one of said pixels and an initial set of test parameters;

(b) determining a second value of said surface parameter for a second one of said pixels with reference to said test parameters by performing a test on at least one of said test parameters to determine whether said first value of said surface parameter is valid for said second one of said pixels and if it is not, updating said at least one test parameter and said first value and repeating the test and said updating until the test indicates that a value of said surface parameter, valid at said second one of said pixels, has been reached;

(c) changing said test parameters to give modified test parameters;

(d) determining a third value of said surface parameter for a third one of said pixels with reference to said modified test parameters by performing said test on at least one of said modified test parameters to determine whether said second value of said surface parameter determined in step (b) is valid for said third one of said pixels and if it is not updating said at least one modified test parameter and said second value and repeating the test and said updating until the test indicates that a value of said surface parameter, valid at said third one of said pixels, has been reached; and (e) using determined values of the surface parameter to display or print an image of the object surface in a perspectively correct manner.

2. A method according to claim 1, wherein said first, second and third pixels are consecutive pixels on a common scan line.

3. A method according to claim 2, wherein a first edge of the surface intersects the common scan line at a span start pixel and a second edge of the object intersects the common scan line at a span end pixel, and wherein, in step (a), the step of setting the initial set of test parameters comprises the steps of:

calculating respective surface parameter values of said span start pixel and said span end pixel in high-precision form; and setting the initial set of test parameters in dependence upon these values.

4. A method according to claim 3, wherein said first pixel is said span start pixel.

5. A method according to claim 3, wherein the surface parameter value of the span start pixel and the surface parameter value of the span end pixel are determined by evaluating a hyperbolic or bi-hyperbolic equation, which equation defines a mapping between said surface parameter and the pixels.

6. A method according to claim 3, wherein a texture image is addressed by first and second texture coordinates; wherein the step of calculating the respective surface parameter values of said span start pixel and said span end pixel comprises calculating values of the first and second texture coordinates as surface parameter values for each of the span start pixel and the span end pixel; and wherein the step of setting the initial set of test parameters includes the step of setting a first test parameter in dependence upon a difference between the values of the first texture coordinate at the span end and span start pixels, and a second test parameter in dependence upon a difference between the values of the second texture coordinate at the span end and span start pixels.

7. A method according to claim 1, wherein the step (c) of changing said test parameters comprises incrementing at least one of the test parameters in dependence upon another of the test parameters.

8. A method according to claim 1, wherein step (e) includes:

storing image data representing an image of the object surface in a frame buffer; and displaying or printing the image of the object surface using the data from the frame buffer.

9. A method of operating an image processing apparatus to interpolate, in a perspectively correct manner, first and second quantized surface parameter mapping coordinates over a perspectively correctly projected object surface in a display space, so as to assign values of said surface parameter for a succession of pixels representing said object, said method comprising the steps of:

testing whether the value of the first mapping coordinate corresponding to a current pixel position within the object is valid at a next pixel position within the object and: (i) if it is, retaining the value of the first mapping coordinate for said next pixel position; but (ii) if it is not, changing the quantized value of the first mapping coordinate until the correct value for said next pixel position is reached;

testing whether the value of the second mapping coordinate corresponding to the current pixel position within the object is valid at the next pixel position within the object and: (i) if it is, retaining the value of the second mapping coordinate for said next pixel position; but (ii) if it is not, changing the value of the second mapping coordinate until the correct value for said next pixel position is reached;

assigning a surface parameter value to said next pixel in dependence upon the values of the first and second mapping coordinates for said next pixel; and using assigned values for the surface parameter to display or print an image of the object surface with correct perspective.

10. A method according to claim 9, wherein the step of changing the first mapping coordinate comprises incrementing the first mapping coordinate by ±1, and wherein the step of changing the second mapping coordinate comprises incrementing the second mapping coordinate by ±1.

11. A method according to claim 9, wherein each of the steps of testing whether the value of the first mapping coordinate corresponding to a current pixel position is valid at a next pixel position, and whether the value of the second mapping coordinate corresponding to the current pixel position is valid at the next pixel position, is performed using a respective decision variable, each decision variable representing the difference between (i) a first test value, being a value between the value of the corresponding mapping coordinate at the current pixel position and the successive value of that mapping coordinate and (ii) a second test value being the value at the next pixel position of a hyperbolic equation relating pixel position to the corresponding mapping coordinate.

12. A method according to claim 11, wherein the decision variable comprises the first test value minus the second test value.

13. A method according to claim 12, wherein each of the steps of testing whether the value of the first mapping coordinate corresponding to a current pixel position is valid at a next pixel position, and whether the value of the second mapping coordinate corresponding to the current pixel position is valid at the next pixel position, is performed by determining whether the decision variable is a negative value, and wherein the value of the mapping coordinate is incremented until the decision variable becomes non-negative.

14. A method according to claim 11, wherein the first test value is half way between the value of the mapping coordinate at the current pixel position and said successive value of that mapping coordinate.

15. A method according to claim 9, wherein the first and second mapping coordinates each have a maximum of 128 values.

16. A method according to claim 9, wherein the first and second mapping coordinates define a texture map.

17. A method according to claim 9, wherein the step of displaying or printing an image of the object surface includes:

storing image data representing an image of the object surface in a frame buffer; and displaying or printing the image of the object surface using the data from the frame buffer.

18. An image processing apparatus for interpolating, in a perspectively correct manner, a quantized surface parameter over an object surface, which surface is represented with correct perspective by pixels in a display space, in order to determine values of said surface parameter for a succession of said pixels, said apparatus comprising:

(a) means for setting a first value of said surface parameter for a first one of said pixels and an initial set of test parameters;

(b) means for determining a second value of said surface parameter for a second one of said pixels with reference to said test parameters by performing a test on at least one of said test parameters to determine whether said first value of said surface parameter is valid for said second one of said pixels and if it is not updating said at least one test parameter and said first value and repeating the test and said updating until the test indicates that a value of the surface parameter, valid at the second one of said pixels, has been reached;

(c) means for changing said test parameters to give modified test parameters;

(d) means for determining a third value of said surface parameter for a third one of said pixels with reference to said modified test parameters by performing said test on at least one of said modified test parameters to determine whether said second value of said surface parameter determined in step (b) is valid for said third one of said pixels and if it is not, updating said at least one modified test parameter and said second value and repeating the test and said updating until the test indicates that a value of said surface parameter, valid at said third one of said pixels, has been reached; and (e) at least one of (i) means for using determined values of the surface parameter to display an image of the object surface in a perspectively correct manner, and (ii) means for using determined values of the surface parameter to print an image of the object surface in a perspectively correct manner.

19. Apparatus according to claim 18, wherein said first, second and third pixels are consecutive pixels on a common scan line.

20. Apparatus according to claim 19, wherein a first edge of the surface intersects the common scan line at a span start pixel and a second edge of the object intersects the common scan line at a span end pixel, and wherein the means (a) comprises:

means for calculating respective surface parameter values of said span start pixel and said span end pixel in high-precision form; and means for setting the initial set of test parameters in dependence upon these values.

21. Apparatus according to claim 20, wherein said first pixel is said span start pixel.

22. Apparatus according to claim 20, wherein the surface parameter value of the span start pixel and the surface parameter value of the span end pixel are determined by evaluating a hyperbolic or bi-hyperbolic equation, which equation defines a mapping between said surface parameter and the pixels.

23. Apparatus according to claim 20, wherein a texture image is addressed by first and second texture coordinates; wherein the means for calculating the respective surface parameter values of said span start pixel and said span end pixel comprises means for calculating values of the first and second texture coordinates as surface parameter values for each of the span start pixel and the span end pixel; and wherein the means for setting the initial set of test parameters includes means for setting a first test parameter in dependence upon a difference between the values of the first texture coordinate at the span end and span start pixels, and means for setting a second test parameter in dependence upon a difference between the values of the second texture coordinate at the span end and span start pixels.

24. Apparatus according to claim 18, wherein the means for changing said test parameters comprises means for incrementing at least one of the test parameters in dependence upon another of the test parameters.

25. Apparatus according to claim 18, wherein means (e) includes a frame buffer.

26. An image processing apparatus for interpolating, in a perspectively correct manner, first and second quantized surface parameter mapping coordinates over a perspectively correctly projected object surface in a display space, so as to assign values of said surface parameter for a succession of pixels representing said object, said apparatus comprising:

means for testing whether the value of the first mapping coordinate corresponding to a current pixel position within the object is valid at a next pixel position within the object;

means for setting the value of the first mapping coordinate for said next pixel position to the value of the first mapping coordinate for said current pixel position if it is determined that the value of the first mapping coordinate for said current pixel position is valid for said next pixel position;

means for changing the quantized value of the first mapping coordinate if it is determined that the value of the first mapping coordinate for said current pixel position is not valid for said next pixel position until the correct value for said next pixel position is reached;

means for testing whether the value of the second mapping coordinate corresponding to the current pixel position within the object is valid at the next pixel position within the object;

means for setting the value of the second mapping coordinate for said next pixel position to the value of the second mapping coordinate for said current pixel position if it is determined that the value of the second mapping coordinate for said current pixel position is valid for said next pixel position;

means for changing the value of the second mapping coordinate if it is determined that the value of the second mapping coordinate for said current pixel position is not valid for said next pixel position, until the correct value for said next pixel position is reached;

means for assigning a surface parameter value to said next pixel in dependence upon the values of the first and second mapping coordinates for said next pixel; and at least one of (i) means for using assigned values of the surface parameter to display an image of the object surface with correct perspective and (ii) means for using assigned values of the surface parameter to print an image of the object surface with correct perspective.

27. Apparatus according to claim 26, wherein the means for changing the first mapping coordinate comprises means for incrementing the first mapping coordinate by ±1, and wherein the means for changing the second mapping coordinate comprises means for incrementing the second mapping coordinate by ±1.

28. Apparatus according to claim 26, wherein each of the means for testing whether the value of the first mapping coordinate corresponding to a current pixel position is valid at a next pixel position, and the means for testing whether the value of the second mapping coordinate corresponding to the current pixel position is valid at the next pixel position, operate using a respective decision variable, each decision variable representing the difference between (i) a first test value, being a value between the value of the corresponding mapping coordinate at the current pixel position and the successive value of that mapping coordinate and (ii) a second test value being the value at the next pixel position of a hyperbolic equation relating pixel position to the corresponding mapping coordinate.

29. Apparatus according to claim 28, wherein the decision variable comprises the first test value minus the second test value.

30. Apparatus according to claim 29, wherein each of the means for testing whether the value of the first mapping coordinate corresponding to a current pixel position is valid at a next pixel position, and the means for testing whether the value of the second mapping coordinate corresponding to the current pixel position is valid at the next pixel position, operate by determining whether the decision variable is a negative value, and wherein the value of the mapping coordinate is incremented until the decision variable becomes non-negative.

31. Apparatus according to claim 28, wherein the first test value is half way between the value of the mapping coordinate at the current pixel position and said successive value of that mapping coordinate.

32. Apparatus according to claim 26, wherein the first and second mapping coordinates each have a maximum of 128 values.

33. Apparatus according to claim 26, wherein the first and second mapping coordinates define a texture map.

34. Apparatus according to claim 26, wherein the means for displaying an image of the object surface or the means for printing an image of the object surface includes a frame buffer.

35. A computer-usable medium storing computer-usable instructions for causing a processor in an image processing apparatus to interpolate, in a perspectively correct manner, a quantized surface parameter over an object surface, which surface is represented with correct perspective by pixels in a display space, in order to determine values of said surface parameter for a succession of said pixels, said instructions comprising instructions for:

(a) causing the processor to set a first value of said surface parameter for a first one of said pixels and an initial set of test parameters;

(b) causing the processor to determine a second value of said surface parameter for a second one of said pixels with reference to said test parameters by performing a test on at least one of said test parameters to determine whether said first value of said surface parameter is valid for said second one of said pixels and if it is not, updating said at least one test parameter and said first value and repeating the test and said updating until the test indicates that a value of said surface parameter valid at said second one of said pixels has been reached;

(c) causing the processor to change said test parameters to give modified test parameters;

(d) causing said processor to determine a third value of said surface parameter for a third one of said pixels with reference to said modified test parameters by performing said test on at least one of said modified test parameters to determine whether said second value of said surface parameter is valid for said third one of said pixels and if it is not, updating said at least one modified test parameter and said second value and repeating the test and said updating until the test indicates that a value of said surface parameter valid at said third one of said pixels has been reached; and (e) causing said processor to use determined values of the surface parameter to generate image data representing an image of the object surface in a perspectively correct manner and to output the image data to at least one of (i) a display device and (ii) a printer.

36. A computer-usable medium according to claim 35, wherein said first, second and third pixels are consecutive pixels on a common scan line.

37. A computer-usable medium according to claim 36, wherein a first edge of the surface intersects the common scan line at a span start pixel and a second edge of the object intersects the common scan line at a span end pixel, and wherein the instructions for causing the processor to set said first value of said surface parameter for said first one of said pixels and said initial set of test parameters comprises instructions for:

causing the processor to calculate respective surface parameter values of said span start pixel and said span end pixel in high-precision form; and causing the processor to set the initial set of test parameters in dependence upon these values.

38. A computer-usable medium according to claim 37, wherein said first pixel is said span start pixel.

39. A computer-usable medium according to claim 37, wherein the surface parameter value of the span start pixel and the surface parameter value of the span end pixel are determined by evaluating a hyperbolic or bihyperbolic equation, which equation defines a mapping between said surface parameter and the pixels.

40. A computer-usable medium according to claim 37, wherein a texture image is addressed by first and second texture coordinates; wherein the instructions for causing the processor to calculate the respective surface parameter values of said span start pixel and said span end pixel comprise instructions for causing the processor to calculate values of the first and second texture coordinates as surface parameter values for each of the span start pixel and the span end pixel; and wherein the instructions for causing the processor to set the initial set of test parameters include instructions for causing the processor to set a first test parameter in dependence upon a difference between the values of the first texture coordinate at the span end and span start pixels, and a second test parameter in dependence upon a difference between the values of the second texture coordinate at the span end and span start pixels.

41. A computer-usable medium according to claim 35, wherein the instructions for causing the processor to change said test parameters to give modified test parameters comprise instructions for causing the processor to increment at least one of the test parameters in dependence upon another of the test parameters.

42. A computer-usable medium storing computer-usable instructions for causing a processor in an image processing apparatus to interpolate, in a perspectively correct manner, first and second quantized surface parameter mapping coordinates over a perspectively correctly projected object surface in a display space, so as to assign values of said surface parameter for a succession of pixels representing said object, said instructions comprising instructions for:

causing the processor to test whether the value of the first mapping coordinate corresponding to a current pixel position within the object is valid at a next pixel position within the object and: (i) if it is, retaining the value of the first mapping coordinate for said next pixel position; but (ii) if it is not, changing the quantized value of the first mapping coordinate until the correct value for said next pixel position is reached;

causing the processor to test whether the value of the second mapping coordinate corresponding to the current pixel position within the object is valid at the next pixel position within the object and: (i) if it is, retaining the value of the second mapping coordinate for said next pixel position; but (ii) if it is not, changing the value of the second mapping coordinate until the correct value for said next pixel position is reached;

causing the processor to assign a surface parameter value to said next pixel in dependence upon the values of the first and second mapping coordinates for said next pixel; and causing the processor to use assigned values of the surface parameter to generate image data representing an image of the object surface with correct perspective, and to output the image data to at least one of (i) a display device and (ii) a printer.

43. A computer-usable medium according to claim 42, wherein the instructions for causing the processor to change the first mapping coordinate comprise instructions for causing the processor to increment the first mapping coordinate by ±1, and wherein the instructions for causing the processor to change the second mapping coordinate comprise instructions for causing the processor to increment the second mapping coordinate by ±1.

44. A computer-usable medium according to claim 42, wherein the instructions for causing the processor to test whether the value of the first mapping coordinate corresponding to a current pixel position is valid at a next pixel position, and the instructions for causing the processor to test whether the value of the second mapping coordinate corresponding to the current pixel position is valid at the next pixel position comprise instructions for causing the processor to perform the tests using a respective decision variable, each decision variable representing the different between (i) a first test value, being a value between the value of the corresponding mapping coordinate at the current pixel position and the successive value of that mapping coordinate and (ii) a second test value being the value at the next pixel position of a hyperbolic equation relating pixel position to the corresponding mapping coordinate.

45. A computer-usable medium according to claim 44, wherein the decision variable comprises the first test value minus the second test value.

46. A computer-usable medium according to claim 45, wherein the instructions for causing the processor to test whether the value of the first mapping coordinate corresponding to a current pixel position is valid at a next pixel position, and the instructions for causing the processor to test whether the value of the second mapping coordinate corresponding to the current pixel position is valid at the next pixel position, comprise instructions for causing the processor to perform the test by determining whether the decision variable is a negative value, and to increment the value of the mapping coordinate until the decision variable becomes nonnegative.

47. A computer-usable medium according to claim 44, wherein the first test value is half way between the value of the mapping coordinate at the current pixel position and said successive value of that mapping coordinate.

48. A computer-usable medium according to claim 42, wherein the first and second mapping coordinates each have a maximum of 128 values.

49. A computer-usable medium according to claim 42, wherein the first and second mapping coordinates define a texture map.

* * * * *

UNITED STATES PATENT AND TRADEMARK OFFICE
CERTIFICATE OF CORRECTION

PATENT NO. : 5,739,818

DATED : April 14, 1998

INVENTOR(S) : JOHN NEIL SPACKMAN

It is certified that error appears in the above-identified patent and that said Letters Patent is hereby corrected as shown below:

COLUMN 3

Line 17, "cartesian" should read --Cartesian--.

COLUMN 7

Line 26, "neglisible" should read --negligible--.

COLUMN 9

Line 4, "$z_1p$" should read --$Z_1p$--; and
Line 42, "$2t-1$" should read --$2t_1-1$--.

COLUMN 19

Line 33, "different" should read --difference--.

COLUMN 20

Line 21, "nonnegative" should read --non-negative--.

Signed and Sealed this

Twenty-fourth Day of November, 1998

Attest:

BRUCE LEHMAN

*Attesting Officer*     *Commissioner of Patents and Trademarks*